May 21, 1935.  B. HANSSON  2,001,873
ELECTRICAL CONDENSER
Filed Nov. 19, 1932  2 Sheets-Sheet 1
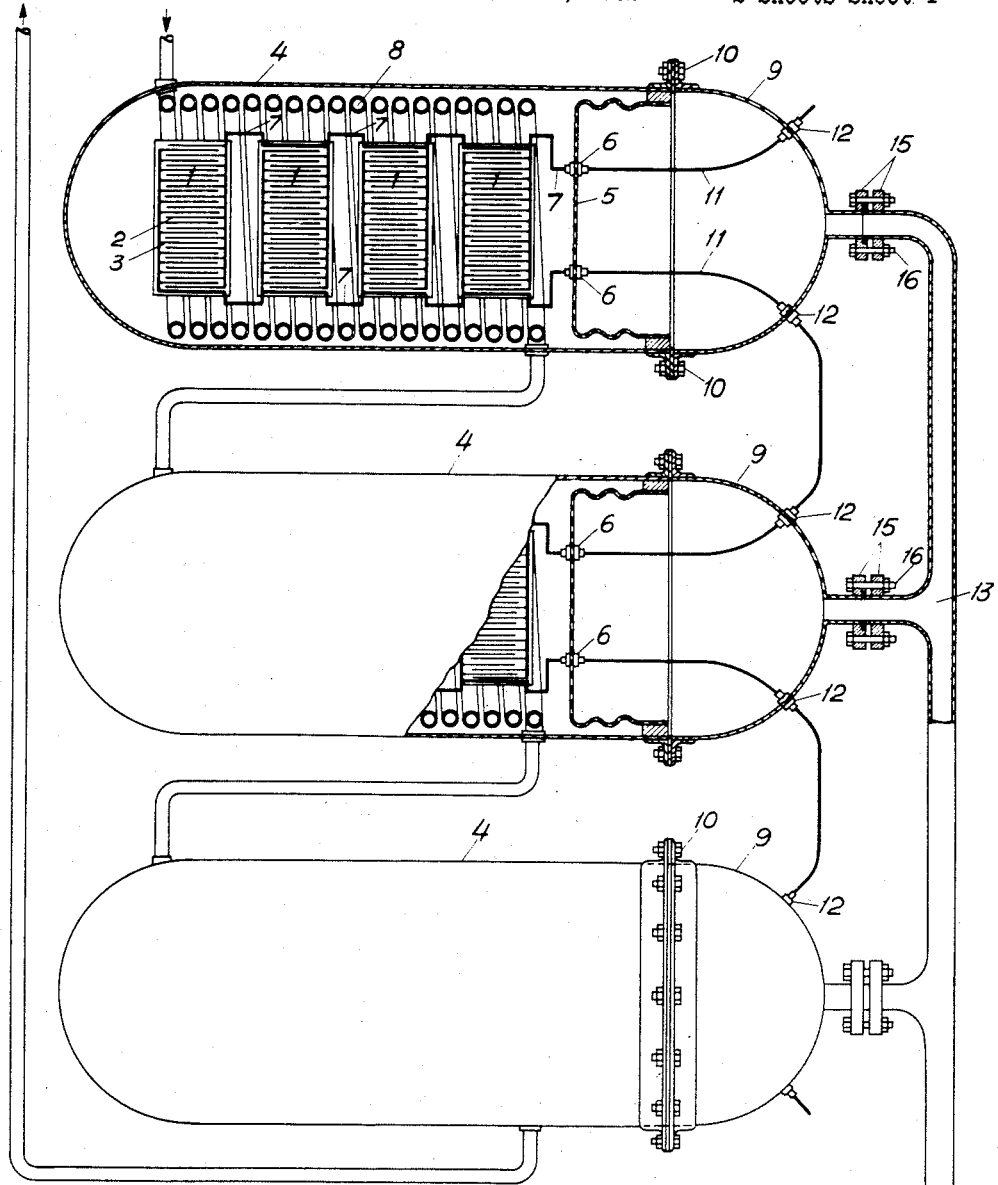
Fig. 1
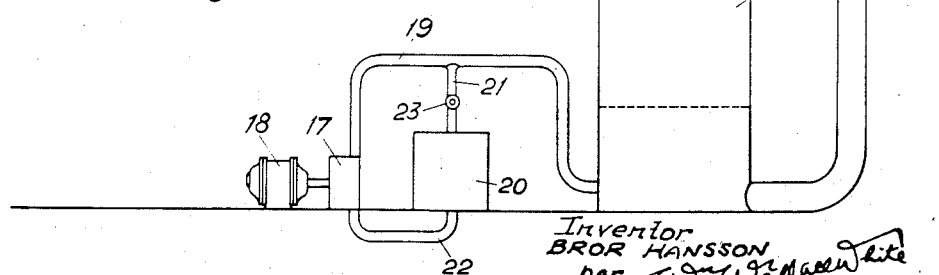
Inventor
BROR HANSSON
per *Wm Wallace White*
ATTORNEY.

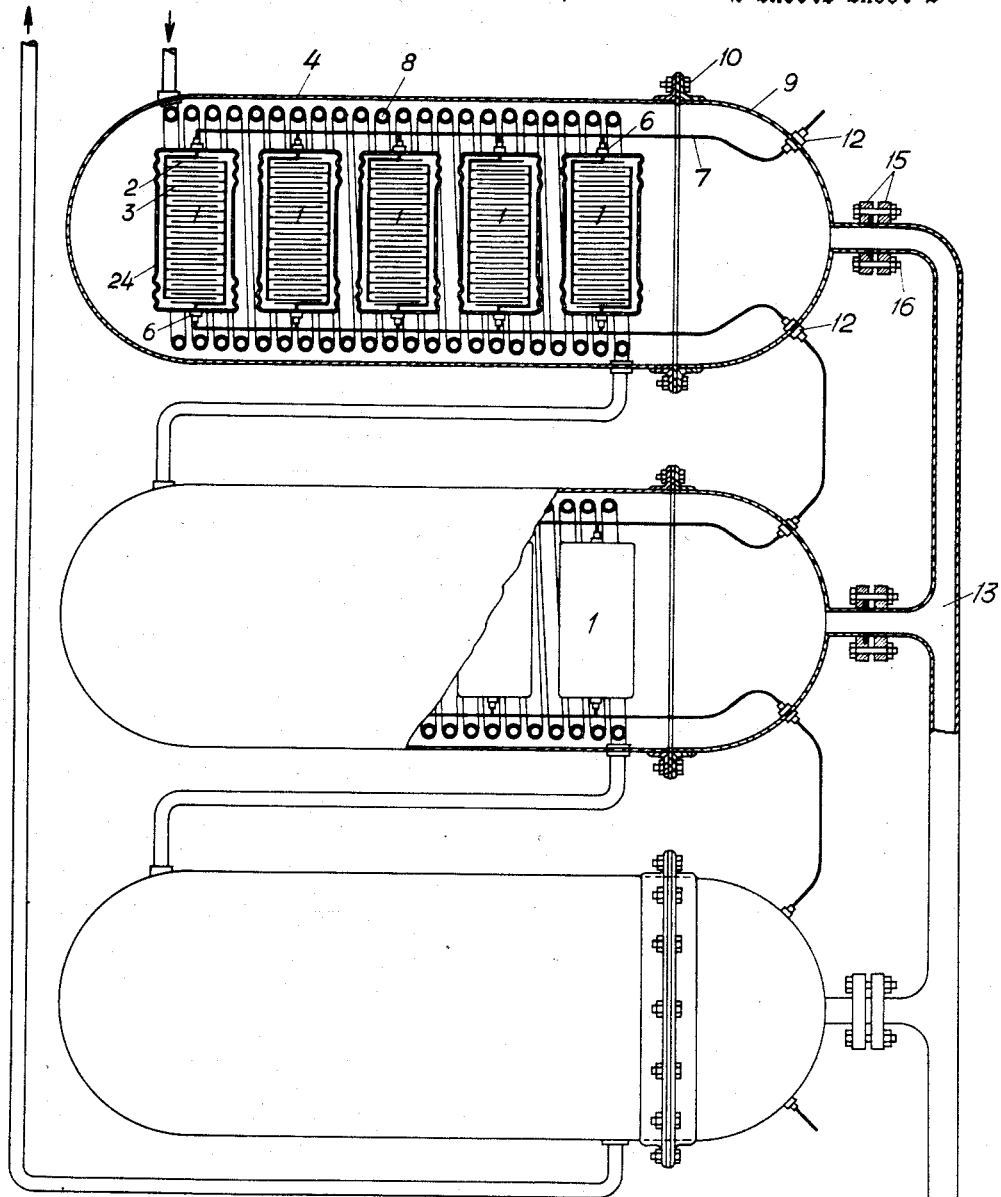
Fig. 2
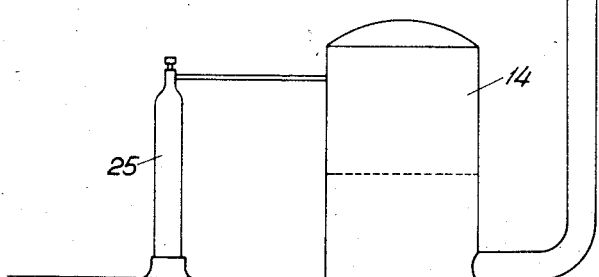

Patented May 21, 1935

2,001,873

UNITED STATES PATENT OFFICE 2,001,873

ELECTRICAL CONDENSER

Bror Hansson, Stockholm, Sweden, assignor to Allmanna Svenska Elektriska Aktiebolaget, Vasteras, Sweden, a corporation of Sweden Application November 19, 1932, Serial No. 643,456
In Sweden November 19, 1931

4 Claims. (Cl. 175—41)

The present invention has for its object an improved type of electrical condensers, especially for high voltages. According to the invention the condenser elements are enclosed in an hermetically closed elastic vessel entirely filled with a suitable insulating fluid. This fluid will therefore not be exposed to the influence of the oxygen of the air and will therefore not be oxidized.

In earlier types of electrical apparatus insulated by a dielectric fluid, the containers have been provided with a special expansion device in the form of an open expansion vessel connected to the container by means of a pipeline. Other devices are also known consisting in a closed elastic vessel communicating with the container, this vessel usually being provided with corrugated walls. In the first case the vessel must have a a volume equal to the maximum expansion of the content of the main container. As the expansion vessel in this case is open, the surface of the oil or fluid will be exposed to the influence of the air, but this surface will be considerably smaller than if the fluid in the container itself would be exposed to the air. In the second case, the expansion vessel must be able to take care of the whole change in volume of the content in the container. As the flexibility of a metallic vessel is rather limited, the volume of the expansion vessel therefore must be of nearly the same size as the main container.

According to the present invention, the main container itself is made flexible enough to take care of the expansion of the content in the container and thus a special expansion device can be omitted.

According to a modification of the invention one or a plurality of elastic vessels containing condenser elements and an insulating fluid are exposed to a pressure in a special pressure vessel. This pressure is transmitted through the yieldable walls of the elastic vessels, and as the pressure of the fluid in the elastic vessels then will be the same as in the pressure vessel, the dielectric strength of the insulating fluid will be raised according to the pressure exerted on it.

In the accompanying drawings two modifications of the invention are shown.

Fig. 1 is an elevation partly in section showing one form of the invention, and Fig. 2 is a similar view showing a modification.

In Fig. 1 a battery of condensers according to the invention is shown. 1 is the condenser elements consisting of conducting foils 2 of a suitable metal separated by insulating films 3. The foils and films are preferably wound helically to a cylindrical bundle. 4 is a container preferably of sheet steel closed by an elastic wall 5. In the elastic wall insulating bushings 6 are fastened and the conducting foils of the condenser elements are interconnected and connected to terminals arranged in the insulating bushings by means of conductors 7. In the interior of the container or vessel 4, a cooling coil is arranged consisting of helically wound pipes passed by a cooling medium, for instance water. The container 4 is provided with a second cover 9 flanged to the container and fastened by means of bolts and nuts 10. The joint between the container 4 and cover 9 may be tightened in the usual manner by a suitable packing.

The space enclosed by the container 4 and cover 9 is thus divided into two compartments by the wall 5. One of these compartments encloses the condenser elements and is entirely filled with a suitable insulating fluid for instance a light oil with great dielectric strength. The other compartment is filled with a rather heavy oil or compound and connected to a pressure chamber or vessel 14 by means of a pipeline 13. The pipeline 13 is joined to the cover 9 by means of flanges 15 pressed together with bolts and nuts 16.

By means of a pump 17 driven by a motor 18 a pressure is exerted on the oil in the pressure equalizing vessel 14. The pump 17 is connected with the vessel 14 by means of a pipe 19. In order to get a limitation of the pressure, the pump is shunted with a pipeline 21, 22. In this pipeline an oil container 20 and an automatically pressure limiting valve 23 are inserted.

In the modification shown at Fig. 2 each condenser element is enclosed in a flat cylindrical elastic vessel 24, which preferably may have corrugated side walls. In this modification the pressure is achieved by a compressed gas, delivered from a container 25. As each condenser element in this modification is enclosed in a closed vessel, the elastic wall 5 can be omitted.

The pressure in both modifications can either be transmitted to the elastic vessels by means of a heavy oil or compound or can the space outside the elastic vessels be entirely filled with a suitable gas, for instance nitrogen or hydrogen.

In both modifications the leading through bushings are placed in the cover 9, but in some cases they may be placed in the walls of the container 4.

I claim as my invention:—

1. An electrical condenser consisting of conducting foils separated by dielectric films, a hermetically closed elastic vessel containing said elements, an insulating fluid entirely filling said vessel, a pressure chamber adjacent to said elastic vessel and filled with a medium under pressure, the elastic vessel being exposed to the pressure of said medium, tight leading through insulators arranged in the walls of said vessel, and conductors connecting said foils to terminals arranged in said insulators.

2. An electrical condenser consisting of conducting foils separated by dielectric films, a hermetically closed elastic vessel containing said elements, an insulating fluid entirely filling said vessel, a pressure chamber adjacent to said elastic vessel filed with a pressure transmitting medium, tight leading through insulators arranged in the walls of said vessel, conductors connecting said foils to terminals arranged in said insulators and a pressure generator exerting a pressure on the pressure transmitting medium in said pressure chamber.

3. An electrical condenser consisting of elements of conducting foils separated by dielectric films, a hermetically closed elastic vessel containing said elements, an insulating fluid entirely filling said vessel, a pressure chamber adjacent to said elastic vessel filled with a pressure transmitting medium, a pump connected to said pressure chamber exerting a pressure on the pressure transmitting medium, a pressure limiting valve, tight leading through insulators arranged in the walls of said vessel, conductors connecting said foils to terminals arranged in said insulators.

4. An electrical condenser comprising a plurality of hermetically closed elastic vessels, containing condenser elements consisting of conducting foils, separated by dielectric films, said elastic vessels being entirely filled with an insulating fluid, a pressure chamber adjacent to said vessels and filled with a pressure transmitting medium, leading through insulators arranged in the walls of said elastic vessels, conductors connecting the conducting foils of the condenser elements with terminals arranged in said insulators, a pressure generating device exerting a pressure on the pressure transmitting medium contained in said pressure chamber and a pressure limiting device consisting of an automatic valve inserted in a by pass connection to said pressure generating device.

BROR HANSSON.